United States Patent [19]

Belsan

[11] Patent Number: 5,148,537
[45] Date of Patent: Sep. 15, 1992

[54] METHOD AND APPARATUS FOR EFFECTING AN INTRA-CACHE DATA TRANSFER

[76] Inventor: Jay S. Belsan, 5646 Magnolia Rd., Nederland, Colo. 80466

[21] Appl. No.: 346,470

[22] Filed: May 2, 1989

[51] Int. Cl.⁵ .................... G06F 12/00; G06F 13/00
[52] U.S. Cl. ................ 395/425; 364/DIG. 1; 395/325
[58] Field of Search ............ 365/189.01, 189.05, 365/230.03, 49; 395/425, 325

[56] References Cited

U.S. PATENT DOCUMENTS

| | | | |
|---|---|---|---|
| 4,276,594 | 6/1981 | Morley | 364/200 |
| 4,317,168 | 2/1982 | Messina et al. | 364/200 |
| 4,349,871 | 9/1982 | Lary | 364/200 |
| 4,371,928 | 2/1983 | Barlow et al. | 364/200 |
| 4,423,479 | 12/1983 | Hanson et al. | 364/200 |
| 4,654,819 | 3/1987 | Stiffler et al. | 364/200 |
| 4,731,758 | 3/1988 | Lam | 365/189.05 |
| 4,755,936 | 7/1988 | Stewart et al. | 364/200 |
| 5,065,312 | 11/1991 | Bruckert et al. | 395/575 |
| 5,099,485 | 3/1992 | Bruckert et al. | 371/68.3 |

Primary Examiner—Alyssa H. Bowler
Attorney, Agent, or Firm—Dorr, Carson, Sloan & Peterson

[57] ABSTRACT

A method and apparatus for effecting a transfer of data between different areas of a memory. Memory reading circuitry and memory writing circuitry are both connected to loopback switching apparatus. The loopback switching apparatus is controllably operable to interconnect the read circuitry with the write circuitry. This permits the data read out of a first memory area to be extended to the write circuitry for entry into a second memory area.

18 Claims, 3 Drawing Sheets

METHOD AND APPARATUS FOR EFFECTING AN INTRA-CACHE DATA TRANSFER

FIELD OF THE INVENTION

This invention relates to a method and apparatus for effecting a transfer of data between different locations of a cache memory. This invention more particularly relates to method and apparatus for effecting an intra-cache transfer over a path that is devoid of buffers or external storage means such as an auxiliary memory.

BACKGROUND OF THE INVENTION

Cache memories are not designed to perform intra-cache data transfers because this mode of operation is not needed during normal operation. However, there are situations, such as during diagnostic activity or when data errors are detected, in which an intra-cache transfer is desirable. At the present time, moving data between different portions of a cache memory may require transferring the data from a first cache memory location to an auxiliary data storage device, and then transferring the data back to a second location in the cache memory. Another alternative is the transferring of data a few bits at a time through a cache control processor between a first and second cache memory location. Both of these alternatives are undesirable. The first alternative is often not available since a given cache system may not have an auxiliary memory. The alternative of transferring a few bits at a time through a control processor is inefficient and undesirable since it may degrade the real time capability of the processor.

It can therefore be seen that no efficient method currently exists for effecting an intra-cache data transfer.

SUMMARY OF THE INVENTION

The present invention solves the above discussed problem and achieves an advance in the art by providing a method and apparatus for transferring data between different portions of a cache memory at high data rates without the use of auxiliary facilities such as a peripheral memory or data processing operations by the cache processor.

The cache memory is connected between the host system and the peripheral devices with which the host system has occasion to exchange data. In accordance with the invention, the cache memory has a plurality of ports each of which has a read and a write interface. Each port is connectable with any peripheral device by means of data buses and loopback circuitry and a switching network intermediate the port and the peripheral device. The cache memory is connected by a plurality of high speed data channels to a host system or, if desired, to a plurality of host systems.

The purpose of the cache memory is to facilitate the exchange of data between the host and the peripheral devices. This is accomplished in the conventional manner by retaining data that is frequently accessed by the host in the cache memory. In this manner, when the data is needed by the host system, it is currently available in the cache memory which is able to transmit the data to the host without accessing a peripheral device and at a higher data rate than that at which the data could be transferred directly between the peripheral device and the host. Also, the cache memory and an associated cache processor gives the cache system the capability of anticipating the data the host will need and of making this data available to the host by transferring the data from the peripheral device to the cache memory well in advance of the time it is needed by the host.

The system of the present invention normally operates in the above discussed manner by permitting the cache memory to facilitate the exchange of data between peripheral devices and the host at a far greater data rate than would be possible without the use of the cache memory. The efficiency of data transfer in the opposite direction is also enhanced. Namely, the host can transmit a block of data to the cache memory at a high speed and instruct the cache memory to transfer the data to a designated peripheral device. The cache memory receives this data over the high speed channel from the host and then subsequently transmits the data to the designated peripheral device at the lower data rate at which the peripheral device is capable of operating. This mode of operation permits the host to operate at maximum efficiency by communicating with the cache memory at high data rates rather than by communicating at lower data rates directly with the peripheral devices.

The operation of the cache memory is controlled by the cache processor, which is connected by a control bus to the cache memory as well as to interface circuits connected to the cache memory. The normal operation of the cache processor is to control the cache memory in the transfer of data between the host system and the peripheral devices. The cache processor also performs routine diagnostic operations and other control operations to determine the operational capability of each element comprising the cache memory system. During these operations, the processor may determine that problems exist in the cache memory or in the circuits associated with the cache memory and that it is desirable to transfer information from one area of the cache memory to another. An example of this would be to transfer information between the volatile and non-volatile portions of the cache. This intra-cache transfer operation can be conveniently and advantageously performed by the method and apparatus of the present invention.

In accordance with the invention, a pair of data buses extending from each cache memory port towards the peripheral devices are connected to a multiplexor unique to the port which can be controlled to interconnect the two buses. When the multiplexor interconnects the two data buses of a port, the output of the read interface of the port is connected to the input of the write interface of the port. With this loopback connection established, the processor issues a command over the control bus to the read interface commanding it to read a block of data from a specified area of the cache memory. The data is read out and applied over one bus of the bus pair extending towards the peripheral devices. With the multiplexor activated, the data received on the first bus is applied by the multiplexor to the second bus of the bus pair. This bus extends back to the write interface of the same port. The data read out of the first area of the cache memory by the read interface of a port is thus looped back by the multiplexor and applied to the input of the write interface of the same port. At the same time, the cache processor sends a command via the control bus to this write interface causing it to write the data it is currently receiving into a portion of the cache memory specified by the cache processor. This loopback connection permits data to be transferred between different portions of the cache memory at high data rates without the use of an auxiliary memory and without the use of the cache processor other than to issue the necessary commands to the read and write interfaces and to the multiplexor.

The method and apparatus of the invention is a significant improvement over the currently available arrangements wherein an intra-cache transfer can only be accomplished by the use of an auxiliary memory or by the use of the cache processor itself wherein its data processing capabilities are used to transfer data from the read interface back to the write interface.

It can therefore be seen that the method and apparatus of the present invention solves the above discussed problems of the prior art by providing an advantageous method and apparatus for transferring data between the different portions of the cache memory on an economically basis without the use of expensive and complex apparatus.

DESCRIPTION OF THE DRAWING

The above and other advantages of the invention may better be understood from a reading of the following description thereof taken in conjunction with the drawings and which.

DETAILED DESCRIPTION

Figure 1:
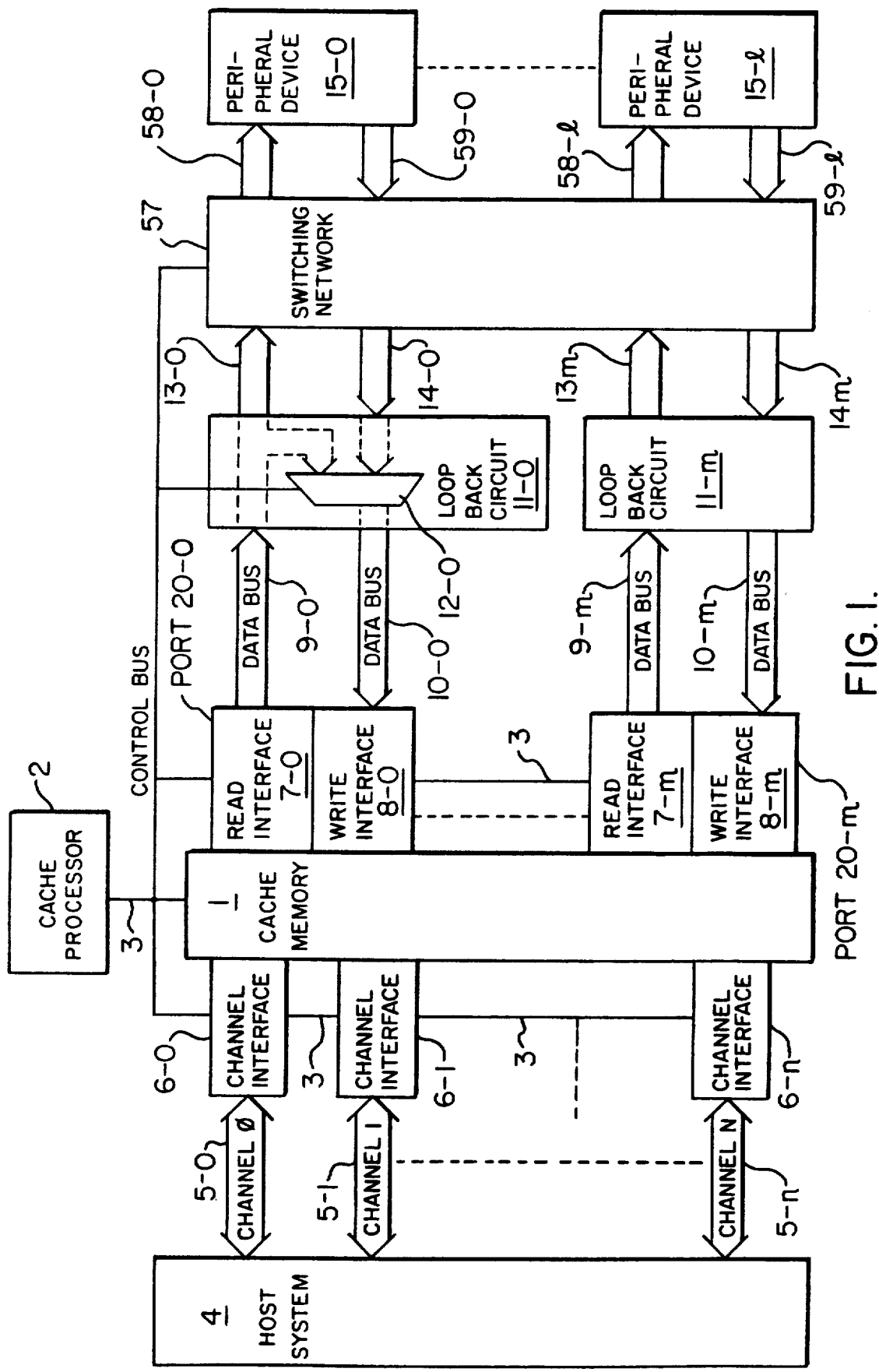
FIG. 1 illustrates a system embodying one possible illustrative exemplary embodiment of the invention.

Description of FIG. 1—The system of FIG. 1 comprises a host system 4, a plurality of peripheral devices 15-0 through 15-1 and a cache memory positioned intermediate host system 4 and peripheral devices 15. Cache memory 1 is connected to host system 4 by a plurality of high speed channels 5-0 through 5-n and an associated plurality of channel interfaces 6-0 through 6-n. Cache memory 1 is connected to peripheral devices 15 via a plurality of ports 20-0 through 20-m. Each port has a read interface and a write interface. Thus, port 20-0 has read interface 7-0 and write interface 8-0. The ports 20-0 through 20-m are connected to a corresponding paired number of unidirectional data buses 9-0 through 9-m and 10-0 through 10-m, which, in turn are connected to a plurality of loopback circuits 11-0 through 11-m. The loopback circuits are connected by paired data buses 13-0 through 13-m and 14-0 through 14-m, switching network 57 to peripheral devices 15-0 through 15-m.

Each port 20 is connectable to any peripheral device 15 via network 57. The details of network 57 comprise no part of the invention. Network 57 may be of any type known in the art that can connect any circuit on its left side with any circuit on its right side. If desired, network 57 may be dispensed with and each port 20 connected to a unique one of peripheral devices 15 via buses 9 and 10, loopback circuit 11 and buses 13 and 14. Each loopback circuit comprises a multiplexor such as multiplexor 12-0 for loopback circuit 11-0. The entire subsystem comprising the cache memory 1, ports 20, loopback circuits 11, and network 57 is controlled by cache processor 2 which is connected by control bus 3 to cache memory 1 and its ports 20 as well as to loopback circuits 11 and network 57.

The normal operation of the system of FIG. 1 is for the cache memory to facilitate the exchange of data between host 4 and peripheral devices 15 at higher data rates than would be the case if host 4 were connected directly to peripheral devices 15. Cache memory 1 contains enough high speed memory and has enough bandwidth to handle data transfers from multiple ports concurrently. Cache memory 1 also contains arbitration logic for handling the scheduling of requests for data transfers from each of a plurality of concurrently requesting ports. The control circuitry internal to the cache memory schedules on a time sliced basis requests for concurrent use of the cache memory in such a manner that the transfers of data between multiple interfaces appear to be essentially on a simultaneous basis.

The details of cache memory 1 and ports 20 comprise no part of the present invention. The cache memory and the ports may be any one of a plurality of currently available devices. One such device which may be advantageously used is the cache memory in IBM 3990 Model 3 Storage Control which is currently commercially available from the International Business Machines Corporation.

Data is exchanged on a high speed basis between host system 4 and cache memory 1 by means of the high speed data channels 5 and the associated channel interfaces 6. Data is exchanged between host 4 and cache memory 1 on a high speed basis commensurate with the capabilities of data channels 5. The cache memory communicates with the peripheral devices 15 by means of the circuitry shown on the right side of the cache memory on FIG. 1.

The normal mode of operation to send data to a peripheral device 15 is for cache read interface 7-0, for example, to read data under control of cache processor 2 out of a specified portion of cache memory 1 and to apply the read out data via bus 9-0 to loopback circuit 11-0. The received data is extended by loopback circuit 11-0 over bus 13-0 to switching network 57 which then establishes a connection to any specified peripheral device, such as device 15-1. In the return direction, the peripheral device 15-1 can apply data through network 57, over bus 14-0, to loopback circuit 11-0 and to the lower input of multiplexor 12-0. The data received on bus 14-0 is normally extended through multiplexor 12-0 and via bus 10-0 to cache write interface 8-0. The data received by write interface 8-0 is written under control of cache processor 2 into a specified area of the cache memory 1.

The above described facilities permit cache memory 1 to receive information at a high data rate from host system 4 and subsequently to enter it at a lower data rate into a peripheral device 15. In a reverse direction, the cache memory permits data to be transferred at a relatively low rate from a peripheral device 15 and, after being stored in the cache memory 1, to be subsequently made available to the host system 4 on a high speed basis via a data channel 5. Multiplexor 12-0 within loopback circuit 11-0 permits data applied by bus 9-0 to loopback circuit 11-0 to be looped back and extended over data bus 10-0 to write interface 8-0. This connection is implemented when cache processor 2 determines that an intra-cache transfer should be effected to transfer data from one portion of the cache memory to another portion. At such times, cache processor 2 transmits a signal over control bus 3 to the control input of multiplexor 12-0 so that the upper input on the right side of multiplexor 12-0 is interconnected signal-wise with its output on the left side of multiplexor 12-0. At this time, bus 10-0 is effectively disconnected signal-wise from bus 14-0 on the lower right hand input of the multiplexor and is connected signal-wise with bus 9-0 connected to the upper right hand input of the multiplexor.

Cache processor 2 then transmits information to read interface 7-0 commanding it to read a data block out of a specified portion of cache memory 1. Read interface 7-0 performs this operation and applies the data read out of the cache memory to bus 9-0. This information is received by loopback circuit 11-0 over bus 9-0 and applied to the upper right hand input of multiplexor 12-0. Since this upper right hand input is now connected signal wise with bus 10-0 on the output of the multiplexor, the data received by loopback circuit 11-0 over data bus 9-0 is looped back and applied via bus 10-0 to write interface 8-0. Write interface 8-0 is controlled over bus 3 by cache processor 2 which commands interface 8-0 to write the data it has received on bus 10-0 into a specified portion of the cache memory 1.

In the same manner, other ports on the peripheral device side of cache memory 1 may be operated by cache processor 2 to effect an intra-cache data transfer operation. Thus, port 20-m which comprises read interface 7-m and write interface 8-m, may be commanded by cache processor 2 to perform an intra- cache data transfer operation. This is done when read interface 7-m reads data out of a portion of the cache specified by cache processor 2. This information is applied over bus 9-m to loopback circuit 11-m which loops the data back to data bus 10-m. The looped back data is received by write interface 8-m and written into a portion of cache memory 1 specified by cache processor 2.

Figure 2:
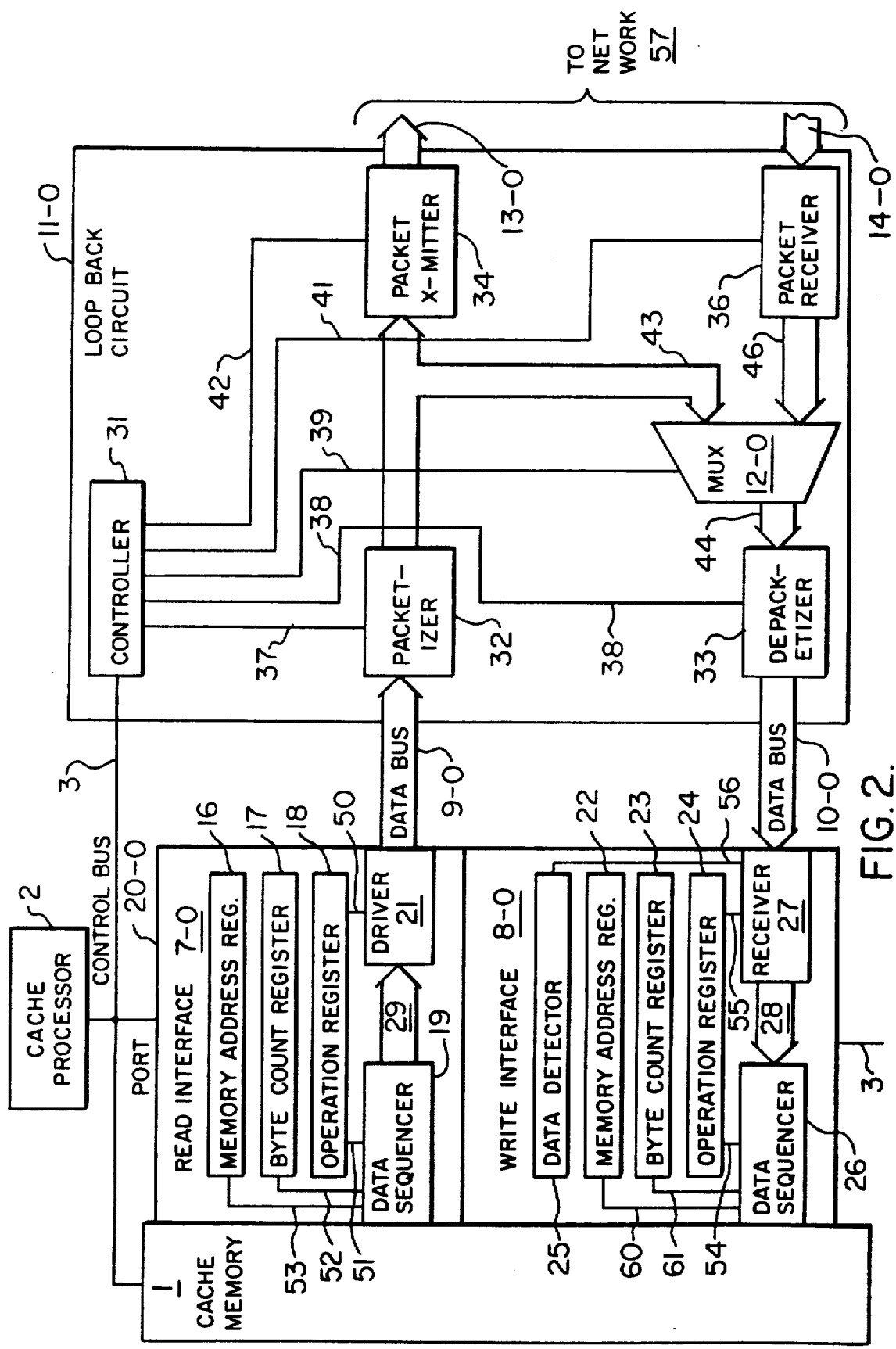
FIG. 2 illustrates further details of the circuitry interconnecting the cache memory and the peripheral devices.

Description of FIG. 2—FIG. 2 discloses further details of the system of FIG. 1. In particular, FIG. 2 discloses further details of a typical port circuit such as 20-0 and it associated loopback circuit 11-0. The other port circuits 20 and the other loopback circuits 11 are identical to that shown in detail on FIG. 2.

Port 20-0 includes read interface 7-0 and write interface 8-0. The read interface contains circuits that control the reading of data from the cache memory and apply the read data to data bus 9-0. The control information needed by read interface 7-0 to perform this function is stored in a number of processor writable registers including a memory address register 16 that points to the beginning location of the data that is to be read, a byte count register 17 which indicates how much data is to be read, and an operation register 18 which defines the mode of operation of read interface 7-0. These registers are loaded with this information when cache processor 2 transmits the appropriate signals over control bus 3 to interface 7-0.

Read interface 7-0 further includes a data sequencer 19, a path 29, and a driver 21. The data sequencer 19 operates under control of signals from the operation register 18 and, in turn, applies the necessary signals to the cache memory to control a read operation in which the specified data is read out of the memory by data sequencer 19 and then extended over path 29 to driver 21. Driver 21 converts the received signals to a format required by data bus 9-0. These signals are applied over data bus 9-0 to the loopback circuit 11-0 which, in a manner subsequently described, returns the data that was received on bus 9-0 back to write interface 8-0 over bus 10-0.

Write interface 8-0 contains the circuits that write the data received from bus 10-0 into the cache memory. The control information needed by write interface 8-0 is contained in a number of processor writable registers including a memory address register 22 whose contents point to the beginning of the area of the cache memory into which the data is to be written. The byte count register 23 indicates the size of the data that is to be written, and the operation register 24 controls the mode of operation of write interface 8-0. Registers 22, 23 and 24 are loaded under control of cache processor 2 when it applies the necessary control signals to control bus 3 for transmission to write interface 8-0. Write interface 8-0 also contains data detector 25 which receives a signal from receiver 27 indicating when data is being received on bus 10-0. Data detector applies a signal over bus 3 to processor 2 to indicate when data is being received.

Receiver 27 of write interface 8-0 receives data from bus 10-0 and extends the data over path 28 to data sequencer 26. Data sequencer 26 communicates with the cache memory and applies the necessary signals to the cache memory to write the data received over path 10-0 into the cache memory location specified by memory address register 22 and byte count register 23. Data sequencer 26 and receiver 27 are cooperatively controlled during this operation by signals received from the operation register 24. The details of read interface 7-0 and write interface 8-0 are known and comprise no part of the invention.

Loopback circuit 11-0 comprises controller 31, packetizer 32, depacketizer 33, packet transmitter 34, packet receiver 36 and multiplexor 12-0. Controller 31 is connected to these various elements over paths 37, 38, 39, 41 and 42 to control their operation. Controller 31, in turn, is controlled by signals applied by cache processor 2 to control bus 3. Packetizer 32 converts the signals received over data bus 9-0 into a format suitable for packet transmission. The packetized data generated by element 32 is applied to bus 43 which extends from the output of packetizer 32 to the inputs of packet transmitter 34 as well as to the upper input of multiplexor 12-0. In normal operation, i.e., when a data loopback operation is not under way, the packetized data on bus 43 is applied to packet transmitter 34 which augments the packet with the identifier of the desired peripheral device and extends the packet over data bus 13-0 (FIG. 1) through network 57 to the identified peripheral device such as device 15-1. In a reverse direction, and in normal operation, peripheral device 15-1 applies packetized data through network 57 over bus 14-0 (FIG. 1) to packet receiver 36 of loopback circuit 11-0. Packet receiver 36 removes the device identification header from the packet and extends this data over path 46 to the lower input of multiplexor 12-0.

The above has described how network 57 can be controlled by device identities augmented to each packet. If desired, and since the details of the network comprise no part of the invention, the network can also be controlled by processor 2 via bus 3. Or the network can be eliminated and each peripheral device 15 can be connected on a one-to-one basis with a unique loopback circuit 11 via buses 13 and 14 (FIG. 1).

During normal operation in which a loopback operation is not in effect, the lower input of multiplexor 12-0 is connected signal-wise to the output of the multiplexor on path 44 (FIG. 2). Therefore, data normally received by the multiplexor on path 46 is extended through the multiplexor and over path 44 to depacketizer 33. This element depacketizes the received data and applies it via path 10-0 to receiver 27 of write interface 8-0. The received information is written into the cache memory location specified by memory address register 22 and byte count register 23 as priorly described.

A data loopback operation is initiated by cache processor 2 when it applies the necessary control signals over bus 3 to controller 31. Controller 31, in turn, applies the necessary signals over path 39 to multiplexor 12-0 to cause the multiplexor to disconnect its lower right hand input on path 46 from its output 44 signalwise and to connect its upper right hand input on path 43 with its output on path 44. With the establishment of this connection, the data that is received by loopback circuit 11-0 on path 9-0 is converted to a packet format by packetizer 32, applied via bus 43 to the upper right hand input of multiplexor 12-0. This data is extended through the multiplexor to bus 44 and depacketizer 33 which depacketizes the data and applies it to bus 10-0. This is now the same data that was received by loopback circuit 12-0 on bus 9-0. The looped back data on bus 10-0 is applied to the input of receiver 27 of write interface 8-0 which applies it over path 28 to data sequencer 26. This causes the received data to be written into the cache memory under control of registers 22, 23, and 24 of write interface 8-0. Detector 25 notifies processor 2 when all of the looped back data has been received.

Figure 3:
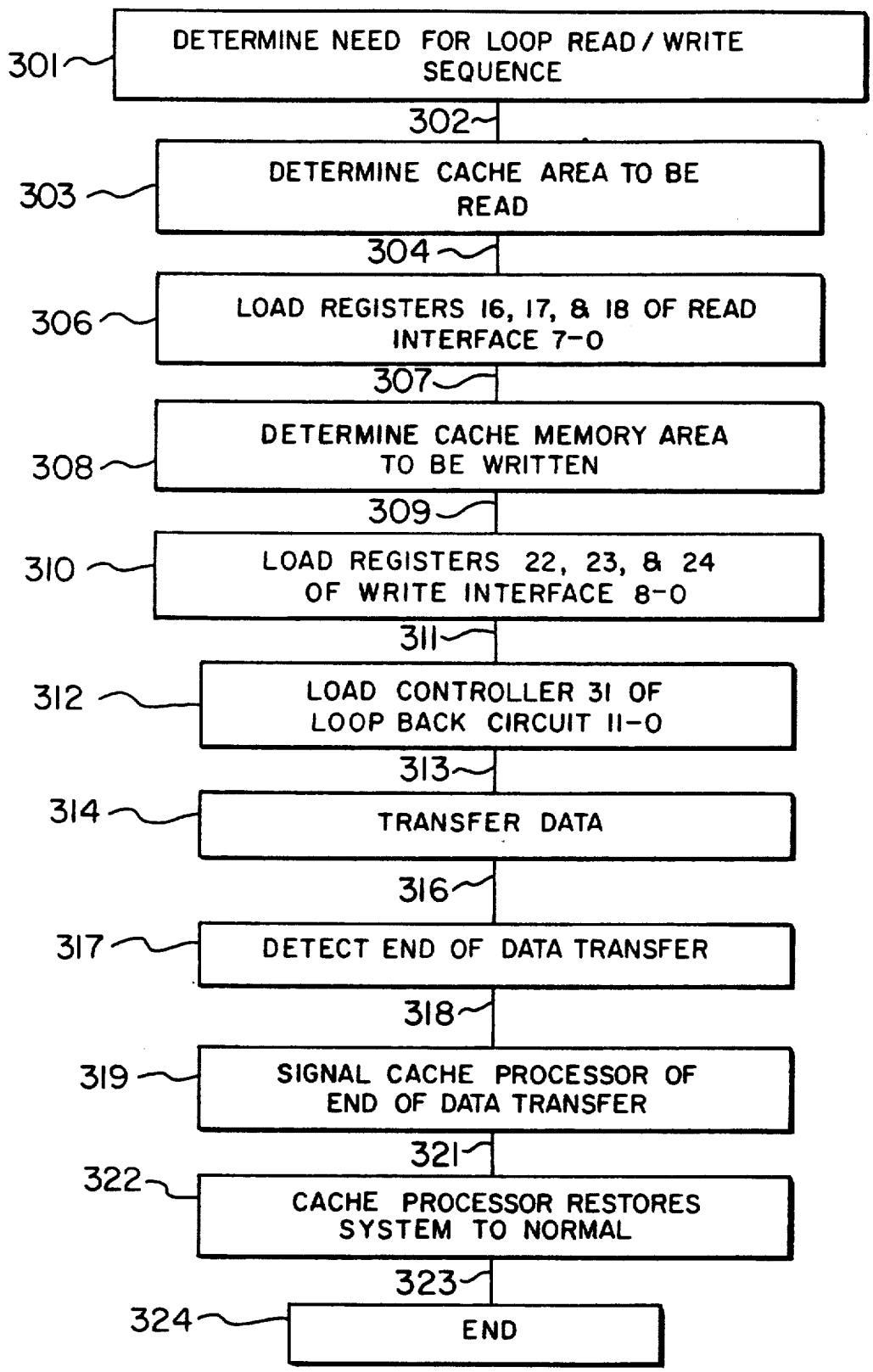
FIG. 3 comprises a flow chart illustrating the manner in which the cache processor operates to effect an intra-cache data transfer.

Description of FIG. 3—FIG. 3 discloses the cache processor 2 operations associated with the establishment of a data loopback operation. In element 301 the processor determines from the programs running in it that data needs to be moved from one location of the cache memory to another. An example of this would occur when the cache memory is made up of some volatile memory and some non-volatile memory. The complete copy of the data is normally kept in the volatile memory and only the modifications to this data are stored redundantly in the non-volatile memory. The volatile memory contains the original data file that was originally received from the associated peripheral device. The modifications or update to this file are then subsequently received from the host system and written redundantly into both the volatile and non-volatile memory portions. If the original file in the volatile memory is lost, the old copy of this file must be retrieved from the associated peripheral device. This is accomplished by the cache processor and when the original data file is retrieved from the peripheral device, it is written back into the volatile portion of the cache memory. However, this file must now be updated with the update information stored in the non-volatile portion of the memory. This requires an intra-cache data transfer using the loopback facilities of the present invention.

The process of FIG. 3 now advances over path 302 to element 303 in which cache processor 2 determines the portion of the cache memory that is to be read in connection with this data loopback operation. This operation is performed and the process advances over path 304 to element 306 in which the cache processor 2 applies the necessary signals to control bus 3 to cause registers 16, 17 and 18 of read interface 7-0 to be loaded with the information needed for a memory read operation. These registers comprise memory address register 16, byte count register 17, and operation register 18. The loading of these registers prepares read interface 7-0 for the initiation of a data loopback operation.

The process then advances over path 307 to element 308 in which the cache processor determines the area of the cache memory into which the looped back data is to be written. The process now extends over path 309 to element 310 in which cache processor 2 applies the necessary signals to control bus 3 to load registers 22, 23 and 24 of write interface 8-0. The information loaded into these registers specifies the portion of the cache memory into which the looped back data is to be written. These registers apply the necessary control signals to data sequencer 26 and receiver 27 of write interface 8-0 to cause the data that is received on bus 10-0 to be written into the specified portion of the cache memory.

The process extends via path 311 to element 312 in which processor 2 applies signals over control bus 3 to controller 31 of loopback circuit 11-0. These signals cause controller 31 to control multiplexor 12-0 so that its output on path 44 is disconnected from its lower input on path 46 and is connected signalwise to its upper input on path 43.

The process now advances over path 313 to element 314 in which cache processor 2 applies the necessary signals to control bus 3 to cause the specified data to be read out of a first location of the cache memory, to be applied by bus 9-0 to loopback circuit 11-0, to be returned by loopback circuit 11-0 to data bus 10-0, and to be received by write interface 8-0 and written into a second location of the cache memory as specified by memory address register 22 and byte count register 23.

This operation continues until the entirety of the data in the first memory location is transferred to the second memory location. The process advances over path 316 to element 317 which determines that the entirety of the loopback data has been received and written into the specified location of the cache memory. This detection that the entirety of the information has been transferred and written is made by data detector 25 of write interface 8-0. The process then advances over path 318 element 319 in which data detector 25 signals cache processor 2 that all of the specified data has been received and written into the cache memory. The process now advances over path 321 to element 322 in which the cache processor applies the necessary signals to control bus 3 to restore the elements of FIG. 2 to a normal operation in which the cache memory and its port 20-0 can exchange data with peripheral devices 15 over the circuity of FIG. 2. The process then advances over path 323 to element 324 which ends the processing steps associated with the present invention and frees up the cache processor 2 to perform normal host system to peripheral device data transfers.

In summary, it may be seen that the method and apparatus of the present invention provides improved facilities for permitting data to be transferred between a first location and a second location of a cache memory. This transfer is accomplished in a manner that does not require the use of an auxiliary memory or buffer, that does not require the addition of complex and expensive facilities, and that does not require extensive data processing operations by the cache processor.

It is to be expressly understood that the claimed invention is not to be limited to the description of the preferred embodiment but encompasses other modifications and alterations within the scope and spirit of the inventive concept.

I claim:

1. Apparatus for transferring data between different areas of a memory, said apparatus comprising;
   a plurality of ports connected to said memory,
   a memory reading means in each port,
   a memory writing means in each port,
   a plurality of loopback switching means each of which is individual to a different one of said ports,
   each one of said loopback switching means being effective for establishing a loopback communication path connecting said reading means of one of said ports with said writing means of said one port,
   means for controlling said reading means of said one port to read data out of a first area of said memory,
   means for applying said data read out of said first area from said reading means of said one port to said writing means of said one port via a loopback path established by said one loopback switching means, and
   means for operating said writing means of said one port to write said data received from said established loopback path into a second area of said memory.

2. The apparatus of claim 1 wherein said one loopback switching means comprises;
   means for extending data read from said memory by said reading means of said one port to a firs communication path extending to a peripheral device,
   a multiplexor having a first and a second input and an output,
   means for connecting said output of said multiplexor to an input of said writing means of said one port,
   means for connecting said first input of said multiplexor to a second communication path incoming from said peripheral device for the extension of data received from said peripheral device to said input of said writing means of said one port via said multiplexor when said first input of said multiplexor is connected signal-wise to said output of said multiplexor,
   means for connecting an output of said reading means of said one port with said second input of said multiplexor, and
   means for controlling said multiplexor to interconnect signal-wise said second input of said multiplexor with said output of said multiplexor to enable said transfer of said data read out from said first area of said memory by said reading means of said one port to said writing means of said one port.

3. Apparatus for transferring data between different areas of a cache memory connected between a host system and peripheral devices, said cache memory being effective for facilitating the exchange of data between said host and said peripheral devices via said memory when said data is not being transferred between said different areas of said cache memory, said apparatus comprising;
   a plurality of ports connected to said cache memory,
   a memory reading means and a memory writing means in each of said ports,
   a loopback switching means for each of said ports,
   means for determining that an intra-cache memory data transfer is to be initiated,
   reading means in one of said ports responsive to said determination for reading data from a first area of said cache memory,
   a first path for interconnecting said reading means of said one port and said loopback switching means of said one port,
   means in said loopback switching mean for applying said data received over said first path to a second path extending towards one of said peripheral devices,
   a third path connecting said writing means of said one port and said loopback switching means,
   means for operating said loopback switching means to connect said first path and said third path for applying said data read out of said first area of said cache memory via said reading means of said one port and via said first path and via said loopback switching means and via said third path to said writing means of said one port, and
   means for operating said writing means of said one port to write said data received from said loopback switching means and said third path into a second area of said cache memory.

4. The apparatus of claim 3, wherein said loopback switching means comprises;
   a multiplexor having a first input and a second input and an output,
   means for connecting said first input of said multiplexor to a fourth path incoming from said one peripheral device for the extension o data received from said one device to said writing means of said one port via said multiplexor and said third path when said first input of said multiplexor is connected signal-wise to said output of sad multiplexor,
   means for connecting said reading means of said one port via said first path with said second input of said multiplexor, and
   means for controlling said multiplexor to interconnect signal-wise said second input of said multiplexor with said output of said multiplexor to enable a transfer of said data rad from said first area of said cache memory to said second area of said memory via said first and third paths and said loopback switching means under control of said reading means and said writing means of said one port.

5. The apparatus of claim 4 wherein said apparatus is controlled by a processor and wherein said reading means comprises;
   a memory address register for storing information specifying an area of said memory from which data is to be read,
   an operating register, and
   a control bus for extending information from said processor to said memory address register and to said operation register,
   said memory address register and said operation register being responsive to the receipt of said information rom said processor for controlling a readout of data from said specified memory area.

6. The apparatus of claim 5 wherein said loopback switching means further comprises;
   means for converting said data received from said reading means of said one port on said first path into a packetized format,
   a packet bus for extending said packetized data to a packet transmitter for transmission over said second path to said one peripheral device,
   said packet bus also being effective for applying said packetized data to said second input of said multiplexor,
   a packet receiver for receiving packetized data from said one peripheral device over said fourth path and for extending said packetized data to said first input of said multiplexor, a depacketizer for receiving packetized data from an output of said multiplexor, said depacketizer being effective for depacketizing packetized data applied to the input of said multiplexor to which said output of said multiplexor is currently connected signal-wise, said depacketizer also being operable for extending said depacketized data over said third bus to said writing means of said one port, a controller in said loopback switching means connected to said control bus for receiving information from said processor for controlling said loopback switching means of said one port, and means connecting said processor to said multiplexor for controlling said multiplexor to loop back and extend said data received by said loopback switching means over said first path back to said writing means of said one port via said third path.

7. The apparatus of claim 6 wherein said writing means of said one-port further comprises;

a memory address register for storing information received from said processor specifying an area in said cache memory into which data received by said writing means of said one port from said loopback switching means via said third path is to be written, an operation register for receiving and storing information received from said processor for controlling the operation of said writing means of said one port, and a data detector for generating an output signal indicting whether or not said writing means of said one port is currently receiving data over said third path from said loopback switching means, said control bus being connected to said writing means of said one port for enabling said processor to apply information to said memory address register and to said operation register of said writing means of said one port to control the operation of said writing means of said one port to write said data received over said third path into a cache memory area specified by said information received by said writing means of said one port.

8. Processor controlled apparatus for transferring data between different areas of a cache memory, said cache memory being connected between a host system and peripheral devices for the exchange of data between said host system and said peripheral devices when said data is not being transferred between said different areas of said cache memory, said apparatus comprising;

a processor, a control bus interconnecting said processor and said cache memory, means for controlling said processor to determine that an intra-cache memory data transfer is to be initiated, a plurality of ports connected to said cache memory, a plurality of loopback switching means connected to paths extending to said peripheral devices, a plurality of paths connected between said ports and said plurality of loopback switching means, each of said ports being connected to said control bus for the exchange of information with said processor, reading means in each port for controlling the reading of data from said cache memory, said processor being operable to transmit information over said control bus to a reading means of one of said ports specifying an area of said cache memory from which data is to be read by said one port, means including said reading means of said one port responsive to the receipt of said information from said processor to read said data from said specified area of said cache memory, means for applying said read data to a first one of said paths connected to said one port, means in the one of said loopback switching means connected to said first path for extending said data applied to said first path to a second path extending to one of said peripheral devices, means for applying data from said one peripheral device to said one loopback switching means over a fourth path, a multiplexor in said one loopback switching means, a first input on said multiplexor for receiving said data on said fourth path from said one peripheral device, a second input on said multiplexor for receiving said data received via said first data path from said reading means of said one port, writing means in each of said ports, an output on said multiplexor normally connected signal-wise with said first input of said multiplexor for the extension of said data received from said one peripheral device over said fourth path to said writing means of said one port over a third path, a controller in said loopback switching means connected to said control bus for receiving information from said processor, said processor being operable for transmitting information over said control bus to said controller to specify the one of said inputs of said multiplexor that is connected signal-wise to said output of said multiplexor, said controller being responsive to the receipt of said information from said processor for causing said multiplexor to disconnect signal-wise said first input from said output and to connect said second input signal-wise with said output, means in said one loopback switching means for extending data appearing on said output of said multiplexor over said third path to said writing means of said one port, means for applying said data read out of said cache memory to said writing means of said one port via said first path and said loopback switching means and said third path, a control register in said writing means of said one port connected to said control bus, means in said processor for applying information over said control bus to said control register of said writing means of said one port specifying an area of said cache memory in which data received by said writing means of said one port over said second bus is to be written, and means for operating said writing means of said one port to write said data received over said third path from said multiplexor into said specified are of said cache memory.

9. The apparatus of claim 8 in combination with a data detector in said writing means of said one port for generating a first output signal when said one port is receiving data from said third path and for generating a second signal when said one port is not receiving data form said third path, said output signals being transmitted over said control bus to said processor to control the operation of said processor.

10. A method for transferring data between different areas of a memory having a plurality of ports wherein each port has a memory reading means and a memory writing means, a plurality of loopback switching means each of which is individual to a different one of said ports, said method comprising the steps of:
operating a reading means of one of said ports to read data out of a first area of said memory,
operating the one of said loopback switching means unique to said one port to establish a loopback path between said reading means of said one port and said writing means of said one port,
applying said data read out of said first memory area from said reading means of said one port to said writing means of said one port via said established loopback path, and
operating said writing means of said one port to write said data received from said established loopback path into a second area of said memory.

11. The method of claim 10 wherein said method comprises the steps of operating said loopback switching means unique to said one port for:
extending data ready by said reading means of said one port over a first portion of said loopback path to a first communication path extending to a peripheral device,
connecting an output of a multiplexor to said writing means of said one port via a second portion of said loopback path,
connecting a first input of said multiplexor to a second communication path incoming from said peripheral device for the extension of data received from said peripheral device to said writing means of said one port via said output of multiplexor and a second portion of said loopback path when said first input of said multiplexor is connected signal-wise to said output of said multiplexor,
connecting said reading means of said one port with a second input of said multiplexor via said first portion of said loopback path, and
controlling said multiplexor to interconnect signal-wise to said second input of said multiplexor with said output of said multiplexor to enable said transfer of data read out from said first area of said memory into said second area of said memory over said first and second portions of said loopback path.

12. A method of transferring data between different areas of a cache memory connected between a host system and peripheral devices for the exchange of data between said host system and said peripheral devices via said cache memory when said data is not being transferred between said different areas of said cache memory, said cache memory having a plurality of ports with each port having a memory reading means and a memory writing means, said method comprising the steps of;
determining that an intra-cache memory data transfer is to be initiated,
operating a reading means of one of said ports to read data from a first area of said cache memory responsive to said determination,
applying said data readout of said cache memory from said reading means of said one port over a first path to a said loopback switching means for said one port,
applying said extended data from said loopback switching means to a second path extending towards one of said peripheral device,
operating a loopback switching means to connect said reading means of said one port via said first path and via a third path with a writing means of said one port,
extending said data read out of said first area of said cache memory and applied via said reading means of said one port to said first path and through said loopback switching means and over said third path to said writing means of said one port, and
operating said writing means of said one port to write said data received from said loopback switching means into a second area of said cache memory.

13. The method of claim 12 wherein said method further comprises the steps of:
connecting an output of a multiplexor in said loopback switching means to said third path,
connecting a first input of said multiplexor to a fourth path extending form said one peripheral device for the extension of data received from said one peripheral device to said writing means of said one port over said third path when said first input of said multiplexor is connected signal-wise to said output of said multiplexor,
connecting said reading means of said one port via said first path with a second input of said multiplexor, and
controlling said multiplexor to interconnect said second input of said multiplexor with said output of said multiplexor to enable said transfer of said data read from said first area of said cache memory to said second area of said cache memory via said loopback switching means and said first and third paths under control of said writing means of said one port.

14. The method of claim 13 wherein said method is controlled by a processor and wherein said step of reading data from said cache memory comprises the steps of;
operating a memory address register in said reading means of said one port for storing information received from said processor over a control bus specifying an area of said cache memory from which data is to be read, and
operating an operation register in said reading means of said one port under control of information received over said control bus from said processors or storing information for controlling said reading means of said one port,
said memory address register and said operation register being responsive to the receipt of information received from said processor over said control bus for controlling a readout of data from the area of cache memory specified by said information.

15. The method of claim 14 wherein said method further comprises the steps of;
operating said loopback switching means to convert said data received by said loopback switching means for said reading mans over said first path into a packetized format,
extending said packetized data over a packet bus to a packet transmitter in said loopback switching means for transmission to said one peripheral device over a said second path,
said packet bus also being effective for applying said packetized data to said second input of said multiplexor, operating a packet receiver to receive packetized data from said one peripheral device over said fourth path and for extending said received packetized data to said first input of said multiplexor, operating a depacketizer in said loopback switching means for receiving packetized data from said output of said multiplexor, said depacketizer being effective for depacketizing packetized data applied to be input of said multiplexor to which said output is currently connected signal-wise, said depacketizer also being operable for extending said depacketized data over said second path to said writing means of said one port, operating a controller in said loopback switching means for receiving information from said processor over said control bus for controlling said loopback switching means, and connecting said controller to said multiplexor for operating said multiplexor to extend said data received from said reading means of said one port over said first path back to said writing means of said one port over said third path via said multiplexor.

16. The method of claim 15 wherein said step of operating said writing means of said one port further comprises the steps of;

storing information in a memory address register in said writing means of said one port specifying a location in said cache memory into which data received by said writing means of said one port from said loopback switching means is to be written, storing information in an operation register in said writing means of said one port for controlling the operation of said writing means of said one port to write data into said cache memory, generating an output signal indicating whether or not said writing means is currently receiving data from said loopback switching means, connecting said writing means of said one port via said control bus to said processor, and applying information from said processor via said control bus to said memory address register and to said operation register of said writing means of said one port to write said data received from said loopback switching means via said third path into a cache memory area specified by said information received over said control bus from said processor by said memory address register of said writing means of said one port.

17. A method of operating processor controlled apparatus for transferring data between different areas of a cache memory, said cache memory being connected between a host system and peripheral devices for the exchange of data between said host system and said peripheral devices when data is not being transferred between said different areas of said cache memory, said method comprising the steps of;

interconnecting said processor and said cache memory via a control bus, operating said processor to determine that an intracache memory data transfer is to be initiated, connecting a plurality of ports having reading means and writing means to said cache memory, connecting each of said ports to said control bus for the exchange of information with said processor, operating said processor to transmit over said control bus to a reading means of one of said ports information specifying an area of said cache memory from which data is to be read by said one port, operating said reading means of said one port responsive to the receipt of said information from said processor to read said data from said specified area of said cache memory, applying said read data to a first path extending from said one port to one of a plurality of loopback switching means, extending said data applied to said first path to a second path extending from said one loopback switching means towards one of said peripheral devices, transmitting data received from said one peripheral device over a fourth path to a first input on a multiplexor in said one loopback switching means, applying to a second input on said multiplexor said data that is received via said first path by said one loopback switching means for said reading means of said one port, connecting an output on said multiplexor to a third path extending to a writing means of said one port, connecting signal-wise said first input of said multiplexor to said output of said multiplexor for the extension of said data received over said fourth path from said one peripheral device to said writing means of said one port via a third path, operating said processor for transmitting information over said control bus to a controller in said loopback switching means to control the one of said inputs of said multiplexor that is connected signalwise to said output of said multiplexor, operating said controller upon the receipt of information from said processor for causing said multiplexor to disconnect signal-wise said first input from said output of said multiplexor and to connect said second input signal-wise with said output of said multiplexor, applying said data read out of said cache memory to said writing means of said one port via said multiplexor of said one loopback switching means and via said first path and said third path, applying information over said control bus to a control register of said writing means of said one port specifying an area of said cache memory in which data received by said writing means of said one port over said second bus is to be written, and operating said writing means of said one port to write said data received over said third path from said multiplexor into said specified area of said cache memory.

18. The method of claim 17 in combination with the steps of;

operating a data detector in said writing means of said one port for generating a first output signal when said one port is receiving data from said third path and for generating a second signal when said one port is not receiving data from said third path, nd transmitting said output signal over said control bus to said processor to control the operation of said processor.

* * * * *